United States Patent
Freitas et al.

(10) Patent No.: US 9,722,648 B2
(45) Date of Patent: Aug. 1, 2017

(54) INTEGRATED CIRCUIT DEVICE, ELECTRONIC DEVICE AND METHOD FOR FREQUENCY DETECTION

(75) Inventors: Philippe Freitas, Toulouse (FR); Olivier Doare, Le Salvetat St Gilles (FR); Valerie Escarpit, Fontenilles (FR); Christophe Landez, Toulouse (FR); Xavier Lhuillier, Paulhac (FR)

(73) Assignee: NXP USA, Inc., Austin, TX (US)

( * ) Notice: Subject to any disclaimer, the term of this patent is extended or adjusted under 35 U.S.C. 154(b) by 702 days.

(21) Appl. No.: 13/985,990

(22) PCT Filed: Mar. 1, 2011

(86) PCT No.: PCT/IB2011/000786
§ 371 (c)(1),
(2), (4) Date: Aug. 16, 2013

(87) PCT Pub. No.: WO2012/117266
PCT Pub. Date: Sep. 7, 2012

(65) Prior Publication Data
US 2013/0331050 A1    Dec. 12, 2013

(51) Int. Cl.
*H04B 1/06*    (2006.01)
*H04L 25/02*   (2006.01)

(52) U.S. Cl.
CPC ........... *H04B 1/06* (2013.01); *H04L 25/0262* (2013.01)

(58) Field of Classification Search
USPC ..... 324/76.19, 76.24; 375/E1.033, 136, 220, 375/224, 272, 316, 342, 344, 355, 340, 375/227, 39, 67.11, 78, 84; 370/311; 455/227, 39, 67.11, 78, 84, 154.1, 161.1, 455/191.3; 377/16, 19; 332/117
See application file for complete search history.

(56) References Cited

U.S. PATENT DOCUMENTS

| 3,824,341 A * | 7/1974 | Jacobson ............... H04N 1/327 375/340 |
| 6,342,818 B1 * | 1/2002 | Segawa ................... H03L 7/143 331/14 |
| 7,589,553 B2 * | 9/2009 | Ullmann ............ H03K 19/1731 257/40 |

(Continued)

FOREIGN PATENT DOCUMENTS

| EP | 0605028 | 7/1994 |
| GB | 2409954 | 7/2005 |
| JP | 2001274848 A | 10/2001 |

OTHER PUBLICATIONS

International Search Report and Written Opinion correlating to PCT/IB2011/000786 dated Dec. 8, 2011.

*Primary Examiner* — Melissa Koval
*Assistant Examiner* — Nasima Monsur
(74) *Attorney, Agent, or Firm* — Charlene R. Jacobsen

(57) ABSTRACT

An integrated circuit comprises a frequency detector. The frequency detector comprises a timer state machine unit operably couplable to a timer and arranged to receive an incoming carrier signal; determine whether the incoming carrier signal comprises a valid frequency; generate a valid carrier indication when the incoming carrier signal is determined as having a valid frequency; and adjust the timer between at least a first timing mode of operation and a second timing mode of operation of the frequency detector in response to the determination.

20 Claims, 8 Drawing Sheets

(56) References Cited

U.S. PATENT DOCUMENTS

| | | | |
|---|---|---|---|
| 2005/0165579 A1* | 7/2005 | Gee | H04L 25/0262 702/179 |
| 2005/0237160 A1 | 10/2005 | Nolan et al. | |
| 2007/0139159 A1 | 6/2007 | Mittal et al. | |
| 2010/0302951 A1* | 12/2010 | Ou | H04L 5/0007 370/242 |
| 2011/0267957 A1* | 11/2011 | Du | H04L 5/0007 370/241 |
| 2012/0064853 A1* | 3/2012 | Rao | H04W 52/0216 455/343.2 |

* cited by examiner

INTEGRATED CIRCUIT DEVICE, ELECTRONIC DEVICE AND METHOD FOR FREQUENCY DETECTION

FIELD OF THE INVENTION

The field of this invention relates to an integrated circuit device, an electronic device and method for frequency detection. In particular, the field of this invention relates to an integrated circuit device, an electronic device and method for an ultra low-power versatile digital frequency detector with a tuneable clock.

BACKGROUND OF THE INVENTION

Many wireless applications, such as Bluetooth™, wireless local area networks (WLAN), cellular communications, radio frequency identifiers (RFID tags)), tire pressure monitoring systems (TPMS), etc. require low complexity phase/frequency detectors that are capable of detecting various modulated signals. Detectors based on analogue limiters and discriminators have been widely employed in some wireless applications, but they typically require large die sizes and off-chip components. Correlator-based digital phase/frequency detectors have been used in some wireless applications.

Typically, radio receivers (RX) in low power applications use frequency detection to determine whether (or not) a received signal's frequency corresponds to an expected frequency for a given radio frequency (RF) communication protocol. This determination is typically performed by continuously, i.e. at each timing period of the received signal, verifying whether (or not) each edge (e.g. a rising edge) of the received signal occurs within an expected time range when compared with a previous edge of the received signal. With such a continuous determination process, the technique requires high speed processing and a high speed reference clock, in order to yield a high performance. The use of high speed processing and a high speed reference clock, however, results in high power consumption of the frequency detector.

In this regard, the faster the determination of whether (or not) the received signal's frequency corresponds to an expected frequency for a given radio frequency (RF) communication protocol, the better is the detection. However, there is a comparable increase in power consumption, which is undesirable in handheld, mobile or power-constrained applications.

FIG. 1 illustrates a flowchart/state machine operation 100 of a known averaging frequency detection technique to verify a received signal's frequency with an average check over several received signal periods being performed. By averaging the determination over several received signal periods lower power consumption may be achieved. The state machine operation 100 starts in an idle mode at 105, with a regular determination of whether a carrier edge of a received signal is detected. If no carrier edge of a received signal is detected, the process loops at 110. If a carrier edge of a received signal is detected at 115, a timer is started and incremented at 120. The state machine operation 100 continues in an idle mode at 125, with a regular determination of whether a further carrier edge of a received signal is detected or whether an end of a time range has been reached, at 130. If an end of a time range has been reached, at 145, a reset operation is performed whereby the timer is stopped and the counter is reset, at 155. The state machine operation 100 then loops back to an idle mode at 105. If a carrier edge of a received signal is detected, at 135, a counter is incremented at 140.

For this illustration, a four-period average check is performed by verifying whether the fifth rising edge occurs within an expected time range of the fifth period. Thus, following the counter being incremented at 140, a determination of whether the counter has reached 'five' is performed. If the counter is less than 'five', at 195, the state machine operation 100 loops back to an idle mode of operation, at 125. If the counter is 'five', and the start of the time range has not been reached, at 150, a reset operation is performed whereby the timer is stopped and the counter is reset, at 155. The state machine operation 100 then loops back to an idle mode of operation at 105. If the counter is 'five', and the time range has been reached, at 160, a validation time may be performed. The validation time consists in the total duration over which the carrier has to be checked. Hence, this validation can be divided into several four-period average checks. If the confirmed total validation time range been reached, at 165, the carrier signal is identified as being valid, at 170, and a signal can be sent to other blocks to start for instance the data demodulation. The frequency detector can then be frozen until the signal sent to other blocks has been externally acknowledged as such at 185, the process being looped to 170. If the signal sent to other blocks is acknowledged as such at 190, the process loops back to an idle mode at 105. If the total validation time has not been reached, at 175, the timer is reset at 180 and the state machine loops back to an idle mode of operation at 125 to perform the next four-period average check process.

FIG. 2 illustrates an example of a timing waveform 200 of a known averaging frequency detection technique. The known averaging frequency detection technique performs an average check over a number of incoming received carrier signal edges 205 to determine whether the incoming received carrier signal is as desired, for example complies with a particular communication protocol. The known averaging frequency detection technique employs a voltage ramp 210 that starts at a first carrier signal edge of the averaging period. If the averaging is performed over four timing periods, as illustrated, the occurrence of the fifth timing carrier signal edge 225 indicates that a real clock of the incoming received carrier signal can be validated if the voltage value of the voltage ramp at the determination point resides between the first voltage reference (Ref1) 255 and the second voltage reference (Ref2) 250. This indicates the ideal timing associated with the frequency detector.

However, as illustrated, random pulses 215, 220 can also be validated even if their frequency is not correct, as the second voltage ramp 240 is determined as residing between the first voltage reference (Ref1) 255 and the second voltage reference (Ref2) 250 at the occurrence of an assumed fifth timing carrier signal edge 230 despite not being based on regular and accurate carrier edges. This error happens as the only condition for the carrier signal to be validated is that there are five instances of a clock cycle (or pulse) between the start and the end of the voltage ramp, such that the voltage level of the voltage ramp, as measured at a given point in time, resides between the first and second voltage reference 250, 255.

Thus, by employing an averaging frequency detection technique to verify the incoming received signal's frequency over several incoming received signal periods, the quality of the frequency detection operation can be greatly reduced, as employing an averaging technique allows the incoming signal frequency to vary greatly between the start and end of the averaging process (of five periods in the above illustration). Hence, although such an averaging technique requires lower speed processing and a lower speed reference clock, and thereby benefits from lower power consumption of the frequency detector, it unfortunately tends to yield a lower performance. With a noisy undesired incoming received signal, such a lower performance through an average check technique can lead to an incorrect determination that a valid incoming received signal has been received.

U.S. 20070139159 (A1) describes a clock generation circuit whereby a clock is generated synchronously to the incoming signal to check a timing of a given preamble, prior to wake up and decoding of the data received in the incoming signal. U.S. 20050237160 (A1) describes a mechanism to reduce false wake-up in a low frequency transponder, whereby a programmable smart filter detects a specific pattern at a beginning of any received incoming signal, prior to outputting the data to a controller.

SUMMARY OF THE INVENTION

The present invention provides an integrated circuit device, an electronic device and a method for frequency detection, as described in the accompanying claims.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings. In the drawings, like reference numbers are used to identify like or functionally similar elements. Elements in the figures are illustrated for simplicity and clarity and have not necessarily been drawn to scale.

DETAILED DESCRIPTION

Examples of the present invention will now be described with reference to an integrated circuit, an electronic device and method of frequency detection, whereby a digital frequency detector alternately and, in some examples, continuously switches from performing an average-based determination of an incoming received carrier signal's edge over a plurality of timing periods and determination of an incoming received carrier signal's edge over a single period.

In this manner, the digital frequency detector provides a better trade-off between power consumption and performance. However, it will be appreciated that examples of the present invention are not limited to the specific integrated circuit device, electronic device and method of frequency detection herein described with reference to the accompanying drawings, and may equally be applied to alternative circuits, architectures and methods. For this illustrated example, the integrated circuit device, electronic device and method of digital frequency detection enables the frequency detector, and in one example a digital frequency detector, to be tuned and the frequency detector's processing speed to be dynamically adapted. In this manner, an overall reduction in power consumption may be achieved during the average check sequences by selectively lowering the number of digital processing operations in a time range, since the events to process are delayed over time.

Also, the frequency detector may be implemented in an analogue form, instead of the herein described digital solution. Furthermore, for the illustrated examples, the frequency detector is shown as switching between an averaging mode of operation across five cycles of an incoming carrier signal representation and a single cycle. However, the frequency detector may equally be implemented by switching between any detection mode, whether averaging or not, e.g. by switching between two single carrier frequencies in a dual-mode wireless communication unit that is capable of switching between two distinct carrier frequencies, for example in an orthogonal frequency division multiplex system.

Some examples may equally be implemented by switching between various averaging modes of operation, and not necessarily limited to selectively switching between averaging across five cycles of an incoming carrier signal representation and a single cycle, as described.

Additionally, because the illustrated example embodiments of the present invention may, for the most part, be implemented using electronic components and circuits known to those skilled in the art, details will not be explained in any greater extent than that considered necessary as illustrated below, for the understanding and appreciation of the underlying concepts of the present invention and in order not to obfuscate or distract from the teachings of the present invention.

Figure 1:
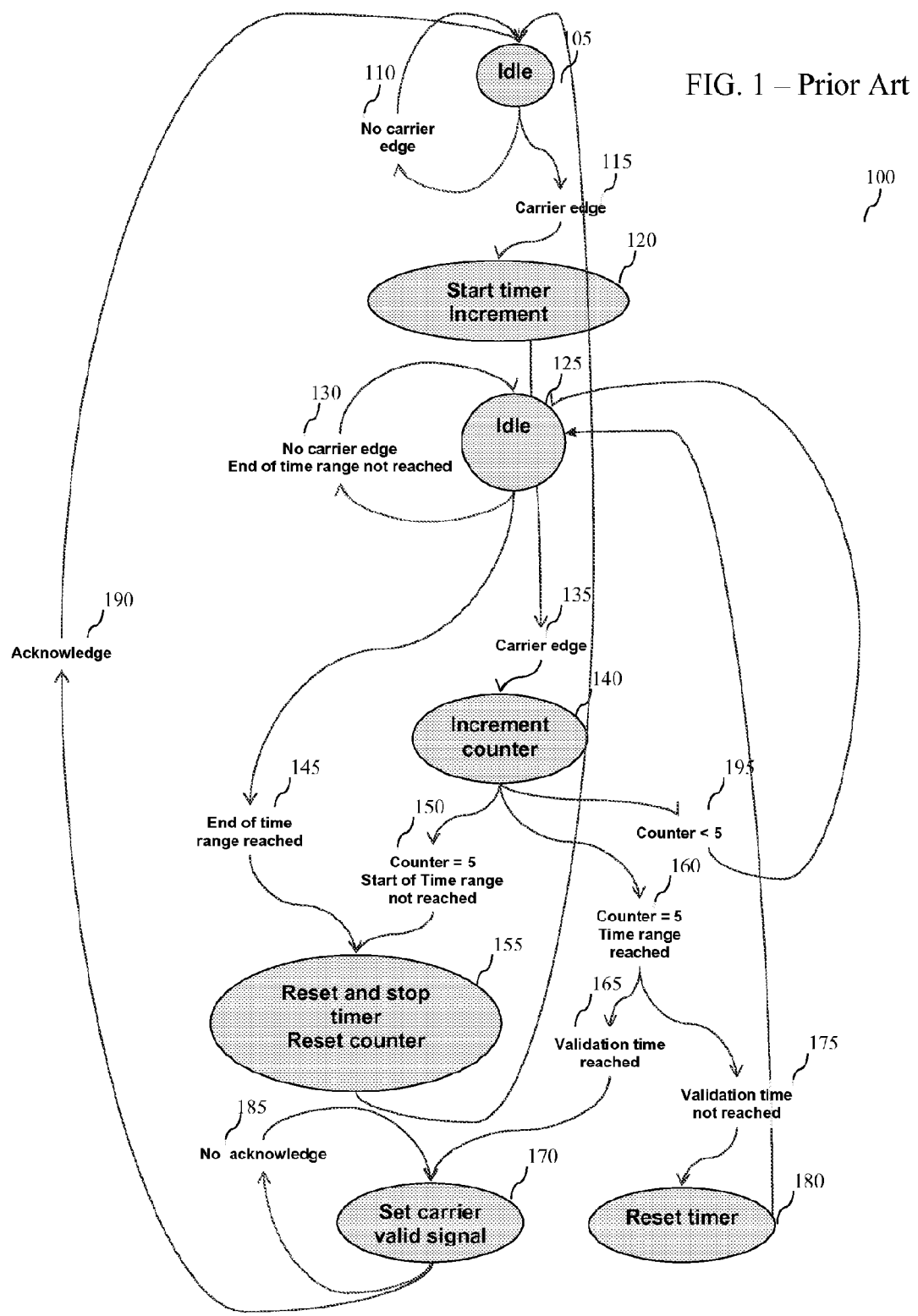
FIG. 1 illustrates a flowchart/state machine operation of a known averaging frequency detection technique.
Figure 2:
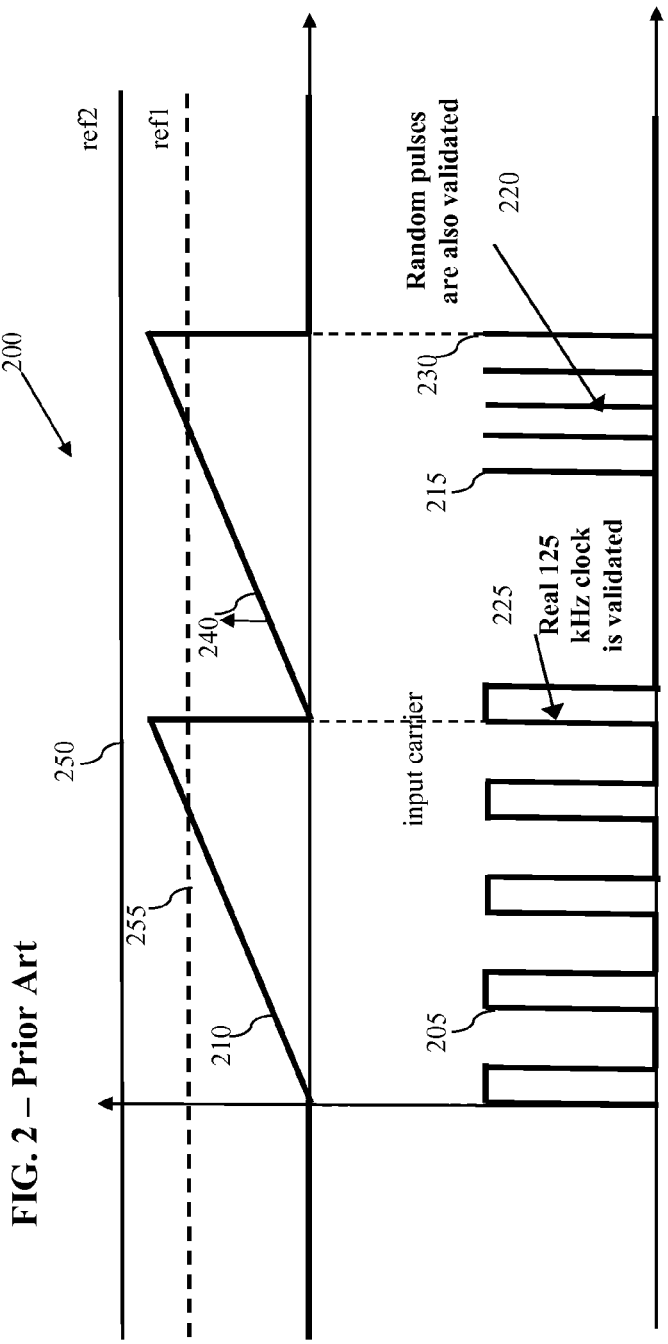
FIG. 2 illustrates an example of a timing waveform of a known averaging frequency detection technique.
Figure 3:
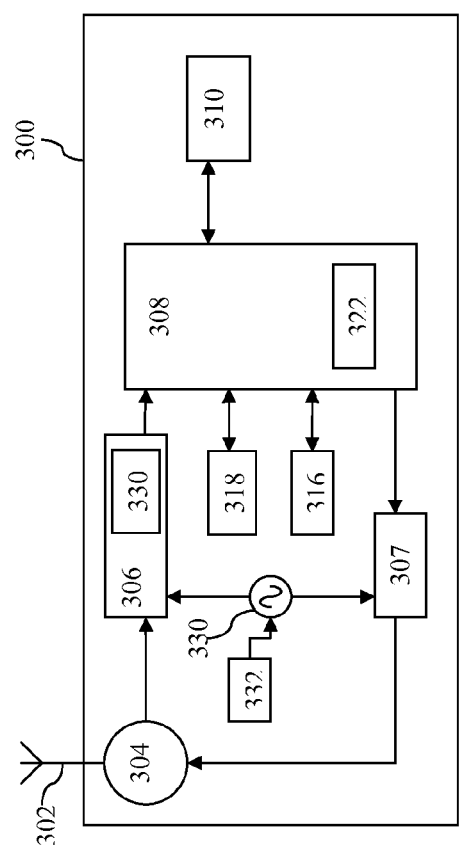
FIG. 3 illustrates an example of a simplified block diagram of part of an electronic device comprising a digital frequency detector.

Referring first to FIG. 3, there is illustrated an example of a simplified block diagram of part of an electronic device 300 comprising a digital frequency detector adapted to support the inventive concept of an example of the present invention. The shown electronic device 300, is a wireless telecommunication handset. The electronic device 300 comprises an antenna 302 and contains a variety of well known radio frequency transceiver components or circuits operably coupled to the antenna 302. In particular for the illustrated example, the antenna 302 is operably coupled to a duplex filter or antenna switch 304 that provides isolation between a receiver chain and a transmitter chain. As is known in the art, the receiver chain typically includes radio frequency receiver circuitry 306 for providing reception, filtering and intermediate or base-band frequency conversion. The radio frequency receiver circuitry 306 can comprise, or be operably coupled to, as shown, signal quality determination circuitry 312. The signal quality determination circuitry 312 may be arranged to determine a quality of the received incoming signal, for example using a simple received signal strength measurement or signal-to-interference measurement or signal-to interference plus noise measurement more complex measurements in a form of bit error rate, etc.

For completeness, the electronic device 300 further comprises a transmitter chain typically includes radio frequency transmitter circuitry 307 for providing modulation and a power amplification signal processing circuit 308. An output from the signal processing circuit 308 may be provided to a suitable user interface (UI) 310 comprising, for example, one or more of: a display, keypad, microphone, speaker etc. The signal processing circuit 308 may also be coupled to a memory element 316 that stores operating regimes, such as decoding/encoding functions and the like and may be realised in a variety of technologies such as random access memory (RAM) (volatile), (non-volatile) read only memory (ROM), Flash memory or any combination of these or other memory technologies. A timer 318 is typically coupled to the signal processing circuit 308 to control the timing of operations within the electronic device 300.

In a receiver mode of operation, received signals may be down-converted to a suitable low frequency or baseband signal to facilitate further processing, for example in a digital domain, by way of mixing the received signals with one or more signals generated by a local oscillator, such as a voltage controlled oscillator VCO, illustrated generally at 334. Such a VCO 334 is arranged to output a defined frequency signal, which may subsequently be modified (e.g. phase shifted and or frequency multiplied/divided) to be switchable for use by the respective transmitter/receiver chain.

In one example, the radio frequency receiver circuitry 306 comprises frequency down conversion circuitry and analogue-to-digital conversion followed by a digital frequency detector 330. The radio frequency receiver circuitry 306, and in some examples the digital frequency detector 330, is operably coupled to the timer 318 in order to correctly process and decode received incoming signals. The radio frequency receiver circuitry 306 may be arranged to convert the incoming received carrier signal into a digital image of the received carrier, for example at the same frequency as the received radio frequency carrier and at a rail-to-rail voltage amplitude, as described with respect to FIG. 4. The digital image can then be fed to the digital frequency detector.

Figure 4:
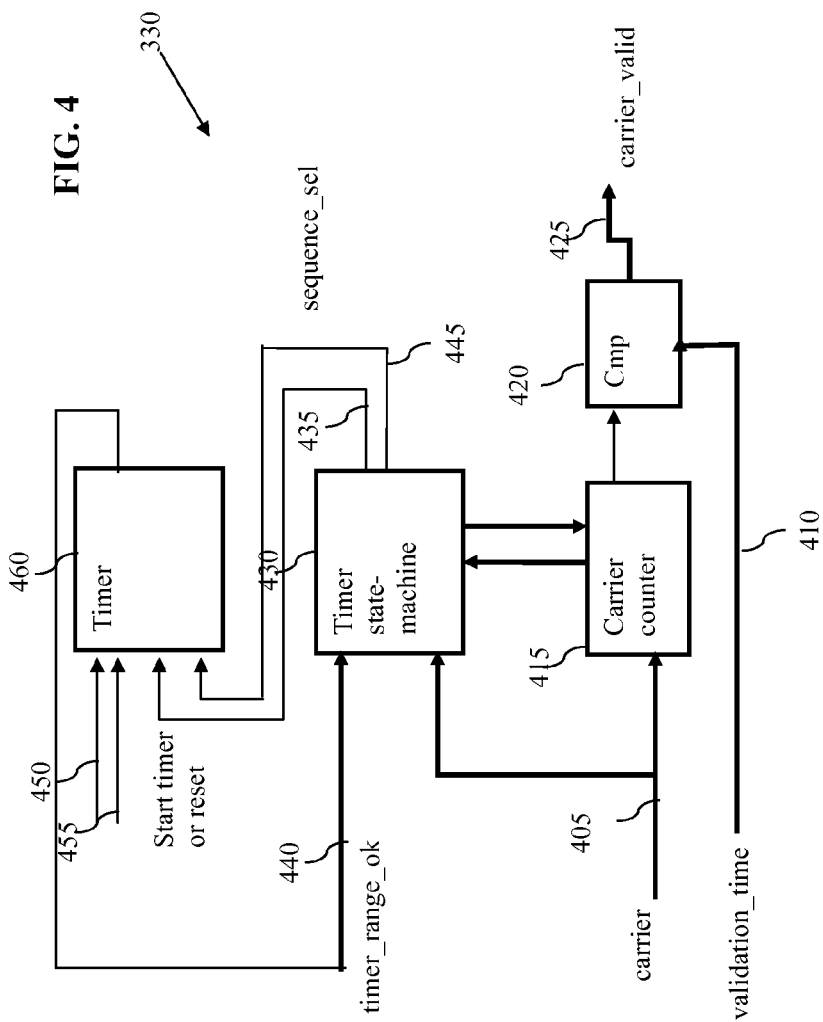
FIG. 4 illustrates a simplified block diagram of an example of part of a digital frequency detector of the simplified example block diagram of FIG. 3.

In one example, the digital frequency detector 330 may comprise a further timer or timer circuit (not shown), arranged to detect whether a frequency of an incoming radio frequency signal is a valid carrier signal, for example whether the carrier signal falls within a particular frequency range (and/or whether a continuous incoming signal comprises a particular timing period) as illustrated in FIG. 4. In some examples, and in response to a signal quality determination of an incoming carrier signal by the signal quality determination circuitry 312, a frequency of operation of the (tunable) timer 318 may be controlled by signal processing circuit 308. In examples, the frequency detector is so-called 'digital' because of the nature of its input, not its output, as, its input is digital, meaning with a rail-to-rail amplitude.

FIG. 4 illustrates a simplified block diagram of an example of an implementation of a part of the digital frequency detector 330 of FIG. 3. The digital frequency detector 330 comprises a timing circuit including a timer 460, operably coupled to a timer state machine unit 430. In one example, the timer 460 is a continuous analogue timer arranged to generate a time base starting from a first edge occurrence of a received incoming carrier signal. The time base enables the digital frequency detector 330 to determine a time range for the expected rise on carrier signal to occur. In one example, the time base runs automatically once the start_timer line 435 is set to a logical '1' value by the timer state machine unit 430. In one example, the start_timer line 435 functions as an enable line for the analog timer 460. In this regard, the start_timer line 435 commences synchronously with a determination of the first carrier edge of a received carrier signal and falls either on a detection of an error or following a positive carrier validation having been confirmed.

An incoming received carrier signal 405 comprises a digital image of the received carrier, for example at the same frequency as the received radio frequency carrier and at a rail-to-rail voltage amplitude. The incoming received carrier signal 405 is input to both a first carrier counter 415 and the timer state machine unit 430. The first carrier counter 415 counts up the number of carrier edges of the incoming received carrier signal 405, as further illustrated in FIG. 8. Comparison circuit 420 compares the number of carrier edges counted over a predetermined or programmable total validation period 410, for example a time over which the received carrier signal has to be checked. If no error is detected by the timer state machine unit 430, the comparison circuit 420 outputs a carrier_valid signal 425 once the counter reaches the value set on a validation_time bus. In one example, a carrier_valid signal 425 may be generated by the comparison circuit 420 only if the incoming received carrier signal is determined as having an acceptable carrier frequency during all the validation time 410, otherwise an error signal may be generated and a reset operation performed.

The timer state machine unit 430 controls the analog timer 460, which is reset via the start_timer 435 signal and sequence_sel signal 445, for performing the next determination of a valid carrier frequency. In one example, the sequence_sel signal 445 that is output from the timer state machine unit 430 to the analogue timer 430 is used to change the timer frequency. An example of timer state machine unit can be to start with an average check. The timer frequency and the expected carrier edge count are set accordingly within the timer state machine unit. If the current average check succeeds, the timer state machine unit automatically toggles to a one-period check. For this, it updates both the timer frequency, changing the sequence_sel value, and the expected carrier signal edge count. Always as an example, the timer state machine unit could have been designed to perform four consecutive one-period checks. If all of them succeed and if the total validation has not been reached yet, the timer state machine unit automatically returns to an average period check, changing the value of both the timer frequency and the expected carrier edge count.

In one example, the timer 460 outputs a time_range_ok signal to the timer state machine unit 430, which may be used to delimit a time range within which the expected carrier edge has to occur, in order to validate the current received carrier signal check sequence.

In one example, the timer 460 comprises two reference signals ref1 455 and ref2 450, which are used to determine whether a voltage ramp signal initiated at a commencement of the carrier frequency determination cycle has risen to within a particular voltage (or current) range that is consistent with the desired carrier frequency. In one example, the two reference signals ref1 455 and ref2 450 may be a voltage reference (Vref). The timer 460 compares a voltage ramp with two voltage references.

The timer state machine unit 430 is also configured to send a reset signal to the carrier counter 415. The reset signal will be sent in case of error. The carrier counter 415 counts up the carrier edges until it receives a reset from the timer state machine unit 430 or once the total validation time is reached.

Figure 5:
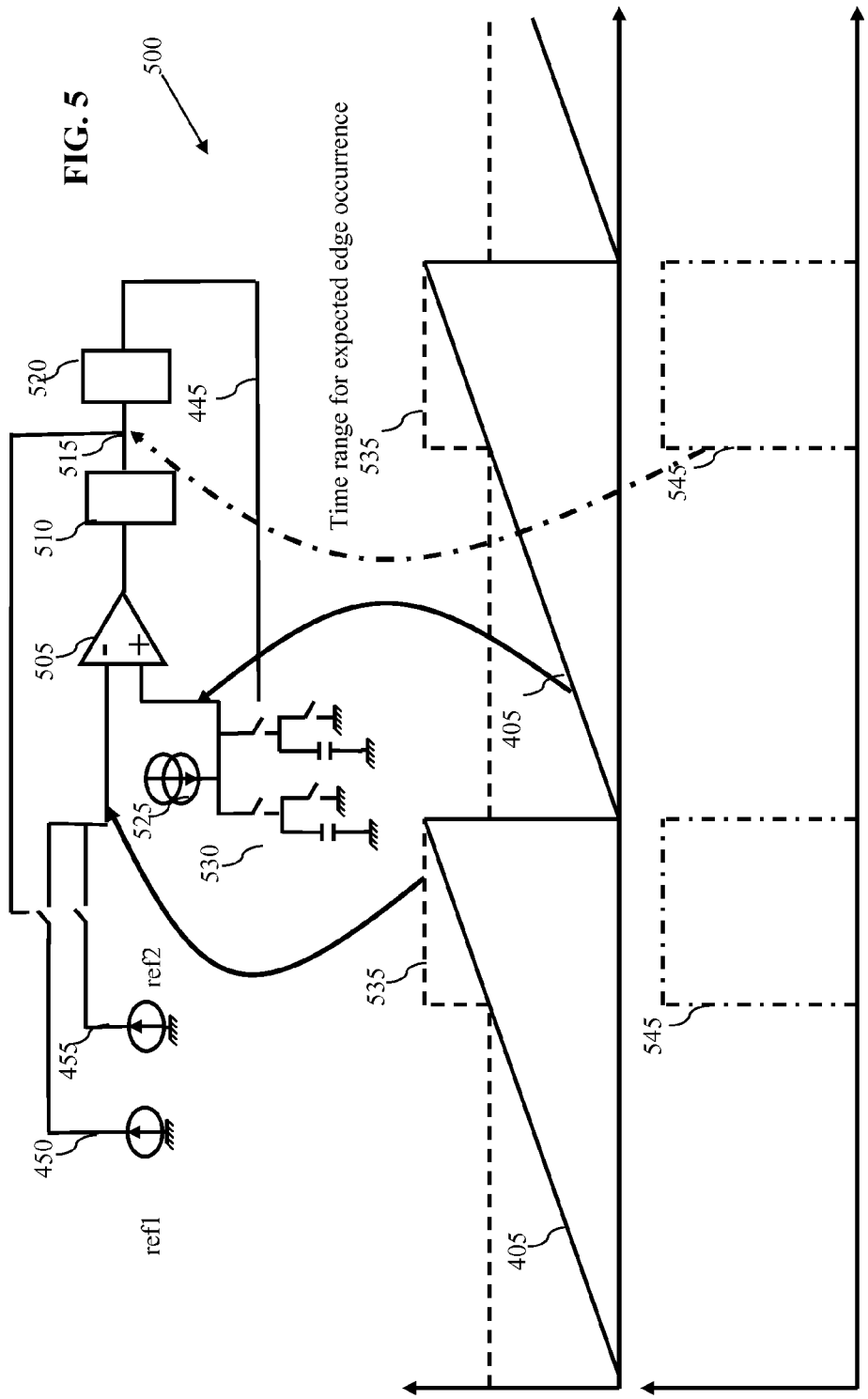
FIG. 5 illustrates a simplified circuit diagram and associated waveforms of an example of part of the digital frequency detector of FIG. 4.

FIG. 5 illustrates a simplified circuit diagram and associated waveforms 500 of an example of part of the digital frequency detector 330 of FIG. 3 and FIG. 4. The simplified circuit diagram comprises two voltage references 450, 455 that provide stable voltages across various operational conditions (for example temperature, supply voltage, process, etc.) to act as threshold voltage values and ensure stability of the timer period, for example a time period provided by timer 460 of FIG. 4. A reference current source ($I_{ref}$) 525 is used only to generate a voltage ramp, 405 across a capacitor in capacitive network 530, of which the slope may be proportional to $I_{ref}/C_{cap}$. The reference current source ($I_{ref}$) 525 is configured to provide constant current into, in order to, where $C_{cap}$ is the total capacitive value of the capacitive network 530. In one example, the capacitors in the capacitive network 530 may be trimmed to ensure accuracy and stability of the timer period. One or both of the voltage references 450, 455, together with the controlled current source, is/are input to a single voltage comparator 505. An output from the single voltage comparator 505 is input to a series of flip-flops 510, 520. The output of the flip-flops 510, 520 may be arranged to toggle at each rising edge of their input, as illustrated at 545, to sequence the timer function. The first flip flop 510 toggles the single voltage comparator 505 negative input from ref1 455 to ref2 450. The second flip flop 520 toggles the single voltage comparator 505 positive input from one capacitor to the other capacitor, thereby resetting the voltage ramp 405. In this manner, the time period 545 may be controlled and the time range for the expected edge occurrence 535 may be set. In the illustrated example having two capacitors in the capacitive network 530, both capacitors are either loaded or discharged, as it is not possible to discharge a capacitor instantaneously and thereby to switch between both.

In some examples, toggling the timer frequency from low speed to high speed may be effected. This may be performed by simply multiplying the reference load current 525. The control signal 515 may, in some examples, be provided from the timer state machine unit, such as timer state machine unit 430 of FIG. 4. In some examples, a number of carrier edges that the digital frequency detector counts to validate the current check may, thus, be configurable. For example, five cycles may be used for a low-speed (averaging) check, with one cycle being set, say, for high-speed one digital frequency detection (e.g. using a single period check). In some examples, this control may also be managed by the timer state machine unit, such as timer state machine unit 430 of FIG. 4.

Figure 6:
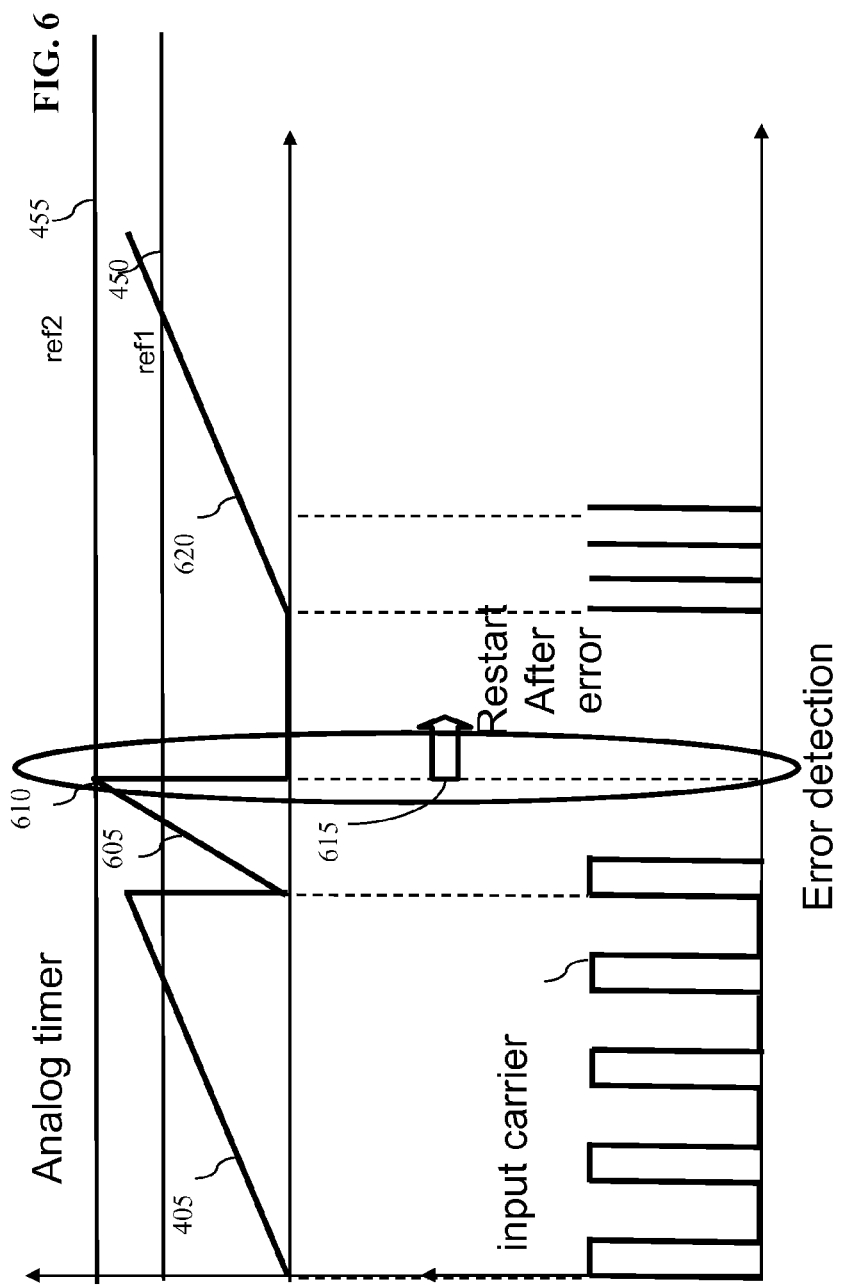
FIGS. 6 to 7 illustrate examples of timing waveforms.

FIG. 6 illustrates an example timing waveform of the digital frequency detector of FIG. 4 or FIG. 5, whereby the detected frequency is not the desired frequency. A voltage ramp 405 is initiated upon a first (or re-started) determination of an incoming received carrier signal. In accordance with one example, the voltage ramp is determined as residing between a first threshold reference voltage level 450 and a second threshold reference voltage level 455 following five cycles of the incoming carrier signal. Thus, at this instance and when determined as residing between a first threshold reference voltage level 450 and a second threshold reference voltage level 455, a valid carrier signal may be generated. As the former average check succeeded, the timer frequency is increased by rating up the slope of the voltage ramp 605. The expected edge count is also updated to a logical '1'. A new voltage ramp 605 is then initiated for a subsequent incoming received carrier signal period. However, in this example, no carrier edge occurs before the voltage ramp reaches the voltage reference 455. The end of the time range for a carrier edge to occur is then reached. In this context, the incoming carrier signal is identified as not being a valid carrier signal, say for the wireless communication unit employing the digital frequency detector. In response to the incoming carrier signal being identified as not being a valid carrier signal, the digital frequency detector identifies an error in the incoming received carrier signal and the digital frequency detection process re-starts 615 and a new voltage ramp 620 commences with the next carrier edge occurrence.

Figure 7:
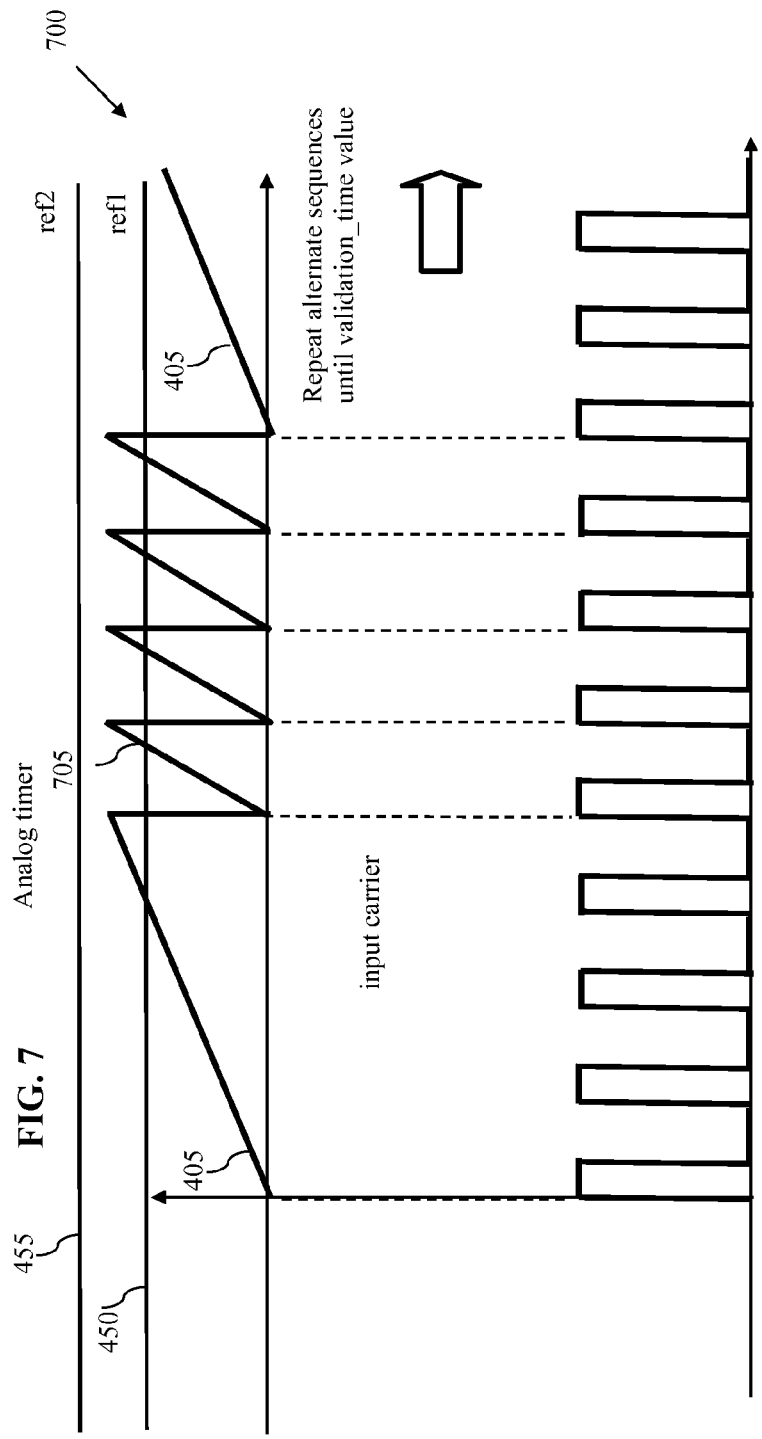

FIG. 7 illustrates a further example timing waveform of the digital frequency detector of FIG. 4 or FIG. 5, whereby the detected frequency is the desired frequency. A voltage ramp is 405 is initiated upon a first (or re-started) determination of an incoming carrier signal. In accordance with one example, the voltage ramp 405 is determined as residing between a first threshold reference voltage level 450 and a second threshold reference voltage level 455 following five cycles of the incoming carrier signal. A timer (for example timer 460 of FIG. 4) provides a signal (for example signal 545 of FIG. 5) to a timer state machine unit (for example timer state machine 430 of FIG. 4) to enable the timer state machine unit to determine whether the validation time has been reached, has not yet been reached, or has overshot. Thus, at this instance, a valid received carrier signal may be generated by the timer state machine if the expected edge count occurs and the timer signal (for example signal 545 of FIG. 5) is at logical '1' state. The signal (for example signal 545 of FIG. 5) is set to a logical '1' when the voltage ramp is between voltage references 450, 455 (or 535 of FIG. 5).

In this example, for example following a determination that the signal quality of the received signal is of a good quality, e.g. is received at a high power level as identified by, say, the signal quality determination circuitry 312 of FIG. 3, the digital frequency detector switches to a single cycle determination mode of operation. A new voltage ramp 705 is then initiated. In this example, the new voltage ramp 705 increases at a higher rate, compared to the number of cycles of the incoming carrier signal of the previous incoming carrier signal. Thus, the new voltage ramp 705 reaches the area between the first threshold reference voltage level 450 and second threshold reference voltage level 455 within a single cycle of the incoming carrier signal. In this context, the incoming carrier signal is identified as still being a valid carrier signal, say for the wireless communication unit 300 of FIG. 3 employing the digital frequency detector 330. The single cycle processing of the incoming carrier signal continues until, say, the state machine unit of FIG. 4 switches the mode of operation back to an averaging technique, whereby the digital frequency detection process re-starts with the lower voltage ramp 405 associated with an averaging of the detection process over, say, five cycles. The averaging process then repeats until the validation time value is reached and a determination is made as to whether the lower voltage ramp 405 signal resides between the first threshold reference voltage level 450 and the second threshold reference voltage level 455 in order to generate a valid_carrier signal.

Figure 8:
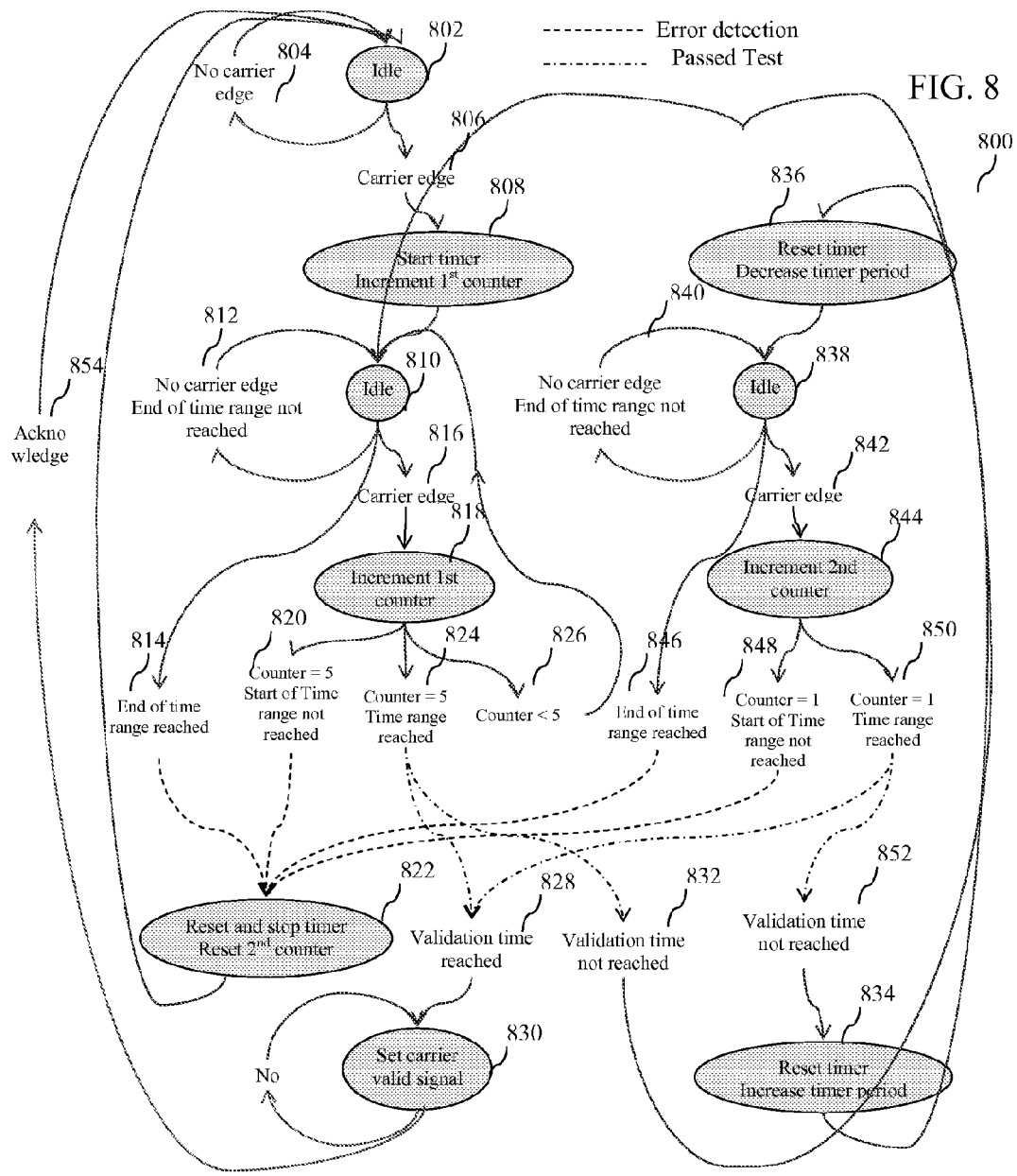
FIG. 8 illustrates a simplified example of a digital frequency detection flowchart/state machine operation.

FIG. 8 illustrates a flowchart/state machine unit operation 800 of a digital frequency detection technique to verify the incoming signal's frequency over several incoming signal periods that achieves lower power consumption. The state machine unit operation 800 starts in an idle mode at 802, with a regular determination of whether a carrier edge of an incoming signal is detected. If no carrier edge of an incoming signal is detected, the process loops at 804. If a carrier edge of an incoming signal is detected at 806, a timer is started and a first counter incremented at 808. The state machine unit operation 800 continues in an idle mode at 810, with a regular determination of whether a carrier edge of an incoming signal is detected and whether an end of a time range has been reached at 812. If an end of a time range has been reached, at 814, a reset operation is performed whereby the timer is stopped and the counter is reset, at 822. The state machine unit operation 800 then loops back to an idle mode at 802. If a carrier edge of an incoming signal is detected, at 816, the first counter is incremented at 818.

For this example, following the first counter being incremented at 818, a determination of whether the first counter has reached 'five' periods, is performed. If the counter is less than 'five', at 826, the state machine unit operation 800 loops back to an idle mode at 810. If the counter is 'five', and the start of the time range has not been reached, at 820, a reset operation is performed whereby the timer is stopped and a second counter is reset, at 822. The state machine unit operation 800 then loops back to an idle mode at 802. If the first counter is 'five', and the time range has been reached, at 824, a validation of the time range may be performed. If there is validation that the time range has been reached, at 828, the carrier signal is identified as being valid, at 830. If the carrier signal is identified as being valid, but not acknowledged as such by another circuit for instance, the process loops to 830. If the carrier signal is identified as being valid, and acknowledged as such at 854, the process loops back to an idle mode at 802. If there is no validation that the time range has been reached, at 832, the timer is reset and the timer period decreased at 836. The process then loops back to an idle mode at 838 with a regular determination of whether a carrier edge of an incoming signal is detected and whether an end of a time range has been reached at 840. If an end of a time range has been reached, at 846, a reset operation is performed whereby the timer is stopped and the second counter is reset, at 822. The state machine unit operation 800 then loops back to an idle mode at 802.

If a carrier edge of an incoming signal is detected, at 842, the second counter is incremented at 844. If the second counter is a logical '1', and the start of the time range has not been reached, at 848, a reset operation is performed whereby the timer is stopped and the second counter is reset, at 822. The state machine unit operation 800 then loops back to an idle mode at 802.

If the second counter is '1', and the start of the time range has been reached, at 850, a validation of the time range may be performed. If there is validation that the total validation time has been reached, at 828, the carrier signal is identified as being valid, at 830. If the carrier signal is identified as being valid, but not acknowledged as such, the process loops to 830. If the carrier signal is identified as being valid, and acknowledged as such at 854, the process loops back to an idle mode at 802. If there is no validation that the total validation time has been reached, at 852, the timer is reset and the timer period increased at 834. The process then loops back to an idle mode at 810 with a regular determination of whether a carrier edge of an incoming signal is detected and whether an end of a time range has been reached at 812.

In this example, two counters may be used where a first counter continuously counts the carrier edges from '0' until a validation time value is reached and a second counter counts from '0' to 'n', with 'n' being dynamically adjustable or programmable or fixed in various examples, say programmed as either a '5' or '1'. In this manner, when programmed as a logical '1', the second counter sets the operation of the digital frequency detector as a 'single' check sequence. Once the current incoming carrier signal check sequence is validated or rejected, the second counter may be reset for the next incoming carrier signal check sequence.

Thus, in some examples, the second counter may be viewed as a temporary counter, arranged to count incoming carrier signal edges from a beginning of a single sequence. In some examples, the state machine unit conditions at 820, 824, 826, 848 and 850 may be configured to be effectively programmable according to the prevailing operating conditions of the digital frequency detector and associated electronic device, such as a wireless communication unit.

In some examples, a frequency change (or filtering improvement) may be achieved through an adjustment of any of the timing or counter parameters at 834, 836, 846, 848, 850.

The known carrier frequency sensing operation relies on a first extract of the frequency carrier using, say, a radio frequency mixer and a local oscillator to produce a low frequency or baseband signal that is then measured and processed to produce a corresponding, representative amplitude of the incoming carrier signal. In some examples, the above digital frequency detector comprises a tunable clock, of which the frequency of operation can be advantageously set in consideration of the incoming signal quality.

In some examples, the provision of a digital frequency detector that facilitates a programmable averaging mode of operation enables the digital frequency detector to switch from an average check of, say, five cycles, to any other averaging over a number of cycles. In some examples, the digital frequency detector may switch from an average check of, say, five cycles, to a single period check, thereby allowing an improved filtering performance and achieving better power consumption. Thus, in some examples, the frequency detector may be dynamically configured such that it is versatile and adaptive to various environmental or operational conditions.

In some examples, the provision of a frequency detector that is able to switch modes of operation in the above manner enables the frequency detector to be able to react to potential noisy signals (or other lower-quality effect) in a more efficient and effective way. For example, as a probability of making an error in detecting a noisy signal during an 'average checking' mode of operation is higher, the frequency detector may decide to switch to a single period checking operation, which reduces the possibility of an incorrect determination. Thus, frequency selectivity is not reduced proportional to the achieved power saving and, hence, a trade-off between power consumption and performances is broken. In some examples, the provision of a digital implementation of the frequency detector allows for a speedy and effective transition/switch between frequency detection techniques, e.g. a single or dual period checking cycle to a more widely used checking cycle of, say, five carrier frequency periods. The examples herein described can be used in applications that have variable operating conditions, such as wireless subscriber communication units or vehicle applications, where the communication environment may be noisy or the operating scenario leads to noisy signals (for example when operating at the edge of a communication cell that would lead to low power noisy signals being received).

In some examples, the switching between alternative received carrier signal determination modes may be continuous and repetitively implemented. In some examples, the switching between alternative received carrier signal determination modes may be dynamically programmable. In some examples, the time spent and any associated switching parameters used to dictate a switching operation between alternative received carrier signal determination modes may be dynamically programmable.

In the foregoing specification, the invention has been described with reference to specific examples of embodiments of the invention. It will, however, be evident that various modifications and changes may be made therein without departing from the broader spirit and scope of the invention as set forth in the appended claims.

The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

Although specific conductivity types or polarity of potentials have been described in the examples, it will be appreciated that conductivity types and polarities of potentials may be reversed.

Each signal described herein may be designed as positive or negative logic. In the case of a negative logic signal, the signal is active low where the logically true state corresponds to a logic level zero. In the case of a positive logic signal, the signal is active high where the logically true state corresponds to a logic level one. Note that any of the signals described herein can be designed as either negative or positive logic signals. Therefore, in alternate embodiments, those signals described as positive logic signals may be implemented as negative logic signals, and those signals described as negative logic signals may be implemented as positive logic signals.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures can be implemented which achieve the same functionality. Specifically, the present invention is not limited to the particular digital frequency detection architecture illustrated in FIG. 4 or FIG. 5, but may equally be implemented within any alternative architectural implementation.

Any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediary components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an", as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an". The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The invention claimed is:

1. An integrated circuit device comprising:
   a frequency detector; wherein the frequency detector comprises:
   a timer state machine unit coupled to a timer and arranged to receive an incoming carrier signal, determine whether the incoming carrier signal comprises a valid frequency, generate a valid carrier indication when the incoming carrier signal is determined as having said valid frequency, and continuously switch operation of the timer between at least a first timing mode of operation and a second timing mode of operation of the frequency detector in response to the determination,
   wherein the detector determines whether the incoming carrier signal comprises said valid frequency in the first timing mode of operation based on a first number of carrier signal edges of the incoming carrier signal, and determines whether the incoming carrier signal comprises said valid frequency in the second timing mode of operation based on a second number of carrier signal edges of the incoming carrier signal, the second number different than the first.

2. The integrated circuit device of claim 1 wherein the first timing mode of operation is an averaging mode of operation whereby the frequency detector determines whether the incoming carrier signal comprises said valid frequency by averaging the determination across a plurality of carrier signal edges of the incoming carrier signal.

3. The integrated circuit device of claim 2 wherein a number of the plurality of carrier signal edges to be averaged over in the first timing mode of operation is programmable.

4. The integrated circuit device of claim 1 wherein in the second timing mode of operation the frequency detector determines whether the incoming carrier signal comprises said valid frequency by performing at least one determination on a single carrier signal edge.

5. The integrated circuit device of claim 1 wherein the frequency detector comprises a tunable timer.

6. The integrated circuit device of claim 5, wherein a frequency of operation of the tunable timer is controllable in response to a determination of a signal quality of the incoming carrier signal.

7. The integrated circuit device of claim 1 wherein the frequency detector is a digital frequency detector.

8. The integrated circuit device of claim 1 wherein
the timer state machine unit is arranged to selectively switch between at least the first mode of operation and the second mode of operation of the frequency detector in determining whether the incoming carrier signal comprises said valid frequency.

9. The integrated circuit device of claim 1 further comprising comparison circuit arranged to compare a number of incoming carrier signal carrier edges counted over a validation period.

10. The integrated circuit device of claim 9 wherein the comparison circuit is operably coupled to a capacitive network and the timer state machine unit, such that the timer state machine unit switches between a first capacitor of the capacitive network and a second capacitor of the capacitive network to effect a timing mode change between the at least first timing mode of operation and the second timing mode of operation of the frequency detector.

11. The integrated circuit device of claim 10 wherein the timer state machine unit switches between a first capacitor of the capacitive network and a second capacitor of the capacitive network effect a change from a high-speed detection to a low-speed detection of the frequency detector.

12. The integrated circuit device of claim 1 wherein the timer state machine unit is further arranged to further re-start an incoming carrier signal detection operation of the frequency detector following a generation of an error signal or following a positive carrier validation having been confirmed.

13. The integrated circuit device of claim 1 wherein the timer state machine unit continuously and repetitively switches between alternate received carrier signal determination modes.

14. The integrated circuit device of claim 1 wherein the timer state machine unit continuously and repetitively switches between alternate received carrier signal determination modes in response to dynamic programming.

15. A method for frequency detection of a frequency detector, the method comprising:
receiving an incoming carrier signal;
determining whether the incoming carrier signal comprises a valid frequency;
generating a valid carrier indication when the incoming carrier signal is determined as having said valid frequency; and
continuously switching between at least a first timing mode of operation and a second timing mode of operation of a timer included at the frequency detector in response to the determination wherein
determining whether the incoming carrier signal comprises said valid frequency in the first timing mode of operation is based on a first number of carrier signal edges of the incoming carrier signal and determining whether the incoming carrier signal comprises said valid frequency in the second timing mode of operation is based on a second number of carrier signal edges of the incoming carrier signal the second number different than the first.

16. An electronic device including a frequency detector, the frequency detector comprising:
a timer state machine unit coupled to a timer and arranged to receive an incoming carrier signal, determine whether the incoming carrier signal comprises a valid frequency,
generate a valid carrier indication when the incoming carrier signal is determined as having said valid frequency, and continuously switch operation of the timer to select between at least a first timing mode of operation and a second timing mode of operation of the frequency detector in response to the determination;
wherein the first timing mode of operation is an averaging mode of operation whereby the frequency detector determines whether the incoming carrier signal comprises said valid frequency by averaging the determination across a plurality of carrier signal edges of the incoming carrier signal; and
wherein in the second timing mode of operation the frequency detector determines whether the incoming carrier signal comprises said valid frequency by performing at least one determination on a single carrier signal edge.

17. The method of claim 15, wherein
the first timing mode of operation is an averaging mode of operation whereby the frequency detector determines whether the incoming carrier signal comprises said valid frequency by averaging the determination across a plurality of carrier signal edges of the incoming carrier signal.

18. The method of claim 15, wherein
in the second timing mode of operation the frequency detector determines whether the incoming carrier signal comprises said valid frequency by performing at least one determination on a single carrier signal edge.

19. The method of claim 15, wherein a number of the plurality of carrier signal edges to be averaged over in the first timing mode of operation is programmable.

20. The method of claim 15, further comprising
selectively switching between at least the first mode of operation and the second mode of operation of the frequency detector in determining whether the incoming carrier signal comprises said valid frequency.

* * * * *